Nov. 21, 1961  S. A. CORREN ET AL  3,009,979
POSITIVE ELECTRODE
Filed Feb. 9, 1959
FIG. 2.
FIG. 1.
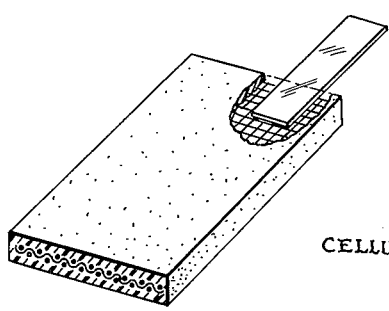
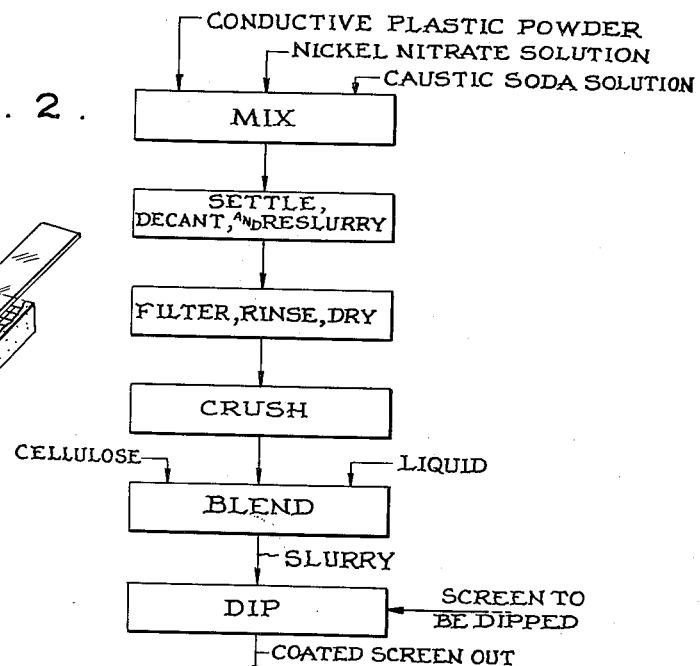
FIG. 4.
FIG. 3.
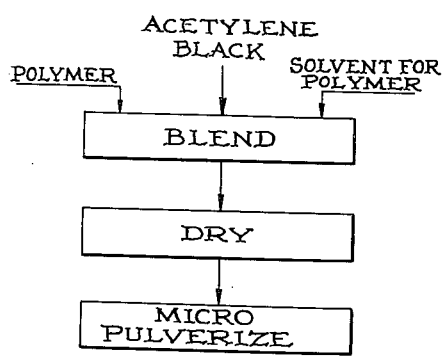
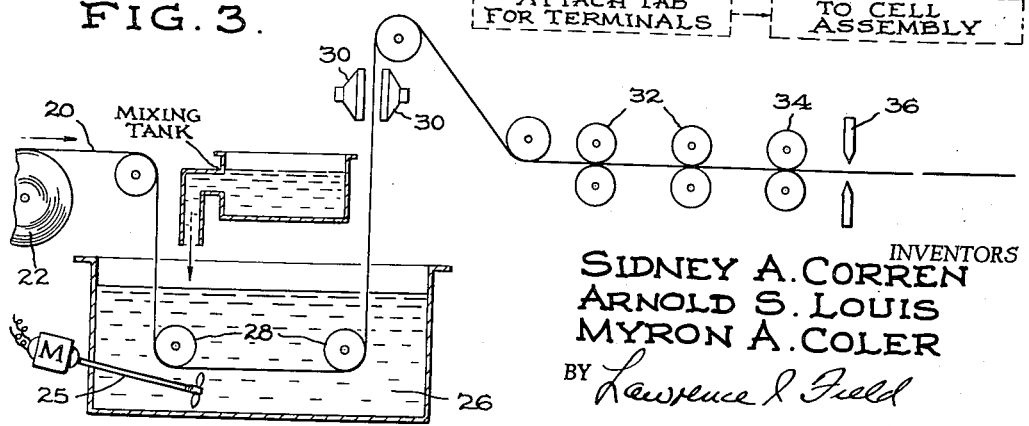
INVENTORS
SIDNEY A. CORREN
ARNOLD S. LOUIS
MYRON A. COLER
BY Lawrence & Field
ATTORNEY

3,009,979
POSITIVE ELECTRODE

Sidney A. Corren, 163 Cherry St., Katonah, N.Y.; Arnold S. Louis, Bronx, N.Y. (87 Southgate Ave., Hastings on Hudson, N.Y.); and Myron A. Coler, 56 Secor Road, Scarsdale, N.Y.
Filed Feb. 9, 1959, Ser. No. 792,060
8 Claims. (Cl. 136—29)

This invention relates to electrodes for secondary batteries, and more particularly to a novel positive electrode and methods of manufacturing same.

Many processes are known for preparing electrodes for secondary batteries. One of those which has found favor in recent years involves the use of a porous sintered plate of carbonyl nickel powder as the support for the chemically active ingredients of the plate, which are caused to be impregnated into the sintered material. Such a process suffers from certain disadvantages, the carbonyl nickel being expensive and in relatively critical supply, and the procedure being complicated and time-consuming, requiring evacuation and repeated impregnation with solutions of salts of the active ingredient, each followed by an electrolytic precipitation of the desired compounds in the pores of the sintered carrier and by washing of the plate after each precipitation.

One object of the invention is the provision of a simple, economical, and practical method for producing positive plates with reproducible properties adapted to yield a battery with a high current capacity expressed as ampere-hours per unit of volume.

Another object of the invention is to provide a method which is suited to either batch operation or continuous production.

Still another object of the invention is to provide a process by means of which electrodes of controlled thicknesses varying from very thin to moderately thick dimensions may be produced.

Still another object of the invention is to provide an electrode-making process in which a desired pore structure may be obtained by building up the electrode through repeated application of a liquid containing the electrode materials dispersed therein and in which the liquid is removed prior to the succeeding application of liquid.

A further object of the invention is to provide a novel electrode comprising a homogeneous mixture of electrically conductive plastic, chemically active material, and fibrous cellulosic material, said mixture being suitably disposed about an electron collector or electron supplying material.

Another object of the invention is to provide a thin battery plate which is both flexible and rugged and which is particularly suited to use in batteries with special requirements as to shape or size.

Still another object is to provide an electrode having a high output current density.

These and other objects will become more apparent from the description which follows.

In the drawings:

FIGURE 1 is a perspective view taken partially in section and showing one type of positive plate prepared according to the present invention;

FIGURE 2 is a flow sheet of a batch procedure for producing the positive plate of FIGURE 1;

FIGURE 3 is a diagrammatic view of an apparatus for carrying out the method of FIGURE 2 as a continuous process; and FIGURE 4 is a flow sheet showing one method of preparing the conductive plastic powder employed in the processes of FIGURES 2 and 3.

For purposes of illustration, the process will be described as it applies to the production of nickel plates, but it will be apparent to those skilled in the art, that the same procedure is applicable to the preparation of plates of other suitable materials.

Briefly, in accordance with the present invention, we first prepare a conductive plastic composition, as a powder, and admix it with the nickel hydroxide-producing ingredients of our positive plate; from this a mixture of the plate constituents is formed in a liquid vehicle and then applied as a slurry to a suitable electron source material. After removal of the liquid the resultant article is trimmed to the desired configuration and then preferably subjected to pressure exerted to reduce the thickness and to increase the capacity as disclosed in a copending application Serial No. 791,856, filed of even date herewith. Thereafter, the plate is given a final trim, if required. At any appropriate stage in the process, tabs serving as terminals may be affixed to the plate electrodes.

It will be appreciated that one or more steps of the process, as set forth above, bears a superficial resemblance to many patented prior art methods for the manufacture of electrodes for batteries, but it should be noted that the several steps constituting the process described in detail below, have been found to cooperate in a specific manner. Thus the formation of the electrode has been found to be most advantageously accomplished by forming a conductive plastic powder in a specific manner; forming nickel hydroxide as a chemical precipitate on the powder particles and thereafter incorporating the resulting material in the electrode in a wet process, carried out so that the electrode is built up in stages, producing pore structures which are particularly desirable as to both amount and distribution and which permit the use of relatively low pressures in the finishing of the plate.

FIGURE 1 represents a positive electrode produced by our process. As shown, the electrode comprises an electron source embedded in a homogeneous mixture of nickel hydroxide or other suitable material in a conductive plastic binder and to which there is secured a terminal tab.

The following example will serve to further illustrate the preparation of the electrode of FIGURE 1 by the batch process of FIGURE 2.

(1) Preparation of conductive plastic

An amount of conductive plastic sufficient for about 50 positive plates was prepared by mixing about 52 grams of VYHH, a copolymer of polyvinyl chloride and polyvinyl acetate, with 49 grams of acetylene black and with 200 cc. of methyl ethyl ketone in a Waring Blendor. The resulting intimate admixture was air dried for two hours in open porcelain drying trays and then oven dried at about 60° C. overnight (12 hours). The resulting cake was micropulverized in a high-speed Metals Disintegrating Co. Bantam Micropulverizer to yield the finely divided conductive plastic powder constituting one constituent of our positive plate.

(2) Incorporation of nickel hydroxide

Forty-five grams of conductive plastic powder were mixed with a hot concentrated solution of nickel nitrate formed by dissolving about 250 grams of $Ni(NO_3)_2 \cdot 6H_2O$ in 225 cc. of heated distilled water. The nickel nitrate solution appeared to wet the conductive plastic powder when mixed at high speed in a Waring Blendor and was converted to nickel hydroxide by the addition of a hot solution of 180 grams of NaOH in 200 cc. of distilled water to the nickel-nitrate-containing solution.

After continuing the blending to insure an intimate admixture, the contents of the Waring Blendor were discharged into a 4-liter settling tank in which the solids settled. The clear supernatant liquid was decanted off the mixture and the mixture was reslurried with more distilled water. After settling, as before, the solids were separated from the overlying liquid by decantation and further washed by a repetition of reslurrying and decantation. The recovered solids were given a final washing on a Büchner filter by rinsing with distilled water until the filtrate obtained had a pH of less than 8. The filter cake was removed from the Büchner filter and was dried in a drying oven, overnight at about 60° C.

The nickle hydroxide-conductive plastic filter cake was broken up by a high speed micropulverizer. At this stage it may be stored for future use. In the present example, it was discharged through the 1/32" screen discharge of the micropulverizer directly into a vessel wherein it was combined with other electrode forming constituents.

(3) Plate preparation

An intimate mixture was formed consisting of about 200 grams of micropulverized conductive plastic powder containing nickel hydroxide prepared as above outlined, about 2.8 grams of filter paper, 320 cc. of benzine, and 480 cc. of methyl ethyl ketone, by blending the ingredients in a Waring Blendor run 5 minutes at high speed and 5 minutes at low speed. The contents of the Blendor were discharged into an open tank. Twenty-mesh nickel screens 4.5" by 1.8", conforming roughly to the desired plate size were dipped into the mixture, withdrawn and air dried; reimmersed, withdrawn and air dried and dipped into the mixture for a total of five times, in order to yield a porous product having the desired porosity and the desired quantity of the mixture, approximately five grams of material on each screen. To insure uniformity, the contents of the dip tank were reblended in a Waring Blendor, run at low speed for 30 seconds after each 3 dips. The plates were air dried and held for the next portion of the process.

(4) Plate finishing

The first step in finishing the plates, each of which now consisted of a nickel screen grid on which about 5 grams of the nickel hydroxide-conductive plastic-filter paper containing mixture had been deposited, was to trim the plate to approximately the final size which was 4.25" x 1.75". After rough trimming the plates were dusted with Dixon 200-10 graphite dust (average size 2½ microns). This was found to improve rapid discharge characteristics in early cycles but was optional in producing satisfactory plates. Thereafter the plates were heated to 100° C. in an oven and passed through a rolling mill a sufficient number of passes to reduce the thickness from an initial thickness of between 0.040 and 0.060 inch to a final thickness of about 0.027 inch, as more fully described in a copending application Serial No. 791,856, filed of even date herewith. The plates were reheated to 100° C. after each pass and were calipered between passes to insure that a uniform rolling schedule was maintained from one plate to the next. It was found that the reheating could be omitted if heated rolls were used. Plates of the dimensions indicated were flexible and could be bent or deformed to assume desired configurations.

In the batch process described, terminals may be attached to the nickel screen at any convenient stage of the process. Thus the screen may be provided with a tab approximately 0.25" x 2" x 0.006" by welding a tab to the electron collector prior to impregnation; or the terminal may be attached to the grid at a later stage in the process. After assembly in a battery the plates were ready for service.

FIGURE 3 is a schematic representation of one manner of producing the plates of FIGURE 1 by a continuous process. In the embodiment shown, 40 x 60 mesh nickel screen 20 is payed out from a supply roll 22 and led into one or more tanks containing a stirrer 25 and slurry 26 consisting of conductive plastic, nickel hydroxide, and filter paper in a mixture of benzine and methyl ethyl ketone as described above. The screen is led past guide means 28 and thence out of tank through a draining region and past a liquid removal station, shown as a plurality of infra-red lamps 30. After removal of the liquid the flexible web passes through a stand of heated rolls 32. Unheated rolls 34 are provided for the final pass. After the last roll stand, means 36 are provided for severing the material to convenient lengths. Before incorporation of the plates into a battery they are trimmed, if necessary, by suitable means (not shown) and have terminals affixed to each plate by other suitable means. The plates are then ready for assembly in secondary batteries.

In the foregoing outline, the procedure has been discussed in terms of a specific example. It will be evident that other proportions and even other ingredients may be substituted for those disclosed, without departing from the invention and that instead of nickel screen other suitable materials may be used as a source of electrons on discharging and a collector of electrons on charging.

For example, in the conductive plastic powder, instead of the specified mixture of acetylene black and polyvinyl chloride-polyvinyl acetate copolymer in the proportions stated in the foregoing example, the relative proportions may be varied between 80:20 and 35:65 by weight. A preferred ratio is one consisting of about equal parts by weight (e.g. 49:52). Other electrically conductive materials may be employed in place of the acetylene black. For example, nickel-coated acetylene black prepared by chemical plating as described for example in United States Patent 2,690,402, or graphite, may be used to furnish the desired electrical conductivity in the final plate composition, either as the sole conductive material or in admixture with other materials.

The relative proportions of conductive plastic to the other constituents may be varied considerably. With the conductive plastic employed, the ratio of nickel hydroxide to conductive plastic may be varied between 1:4 and 4:1 by weight, but the optimum results were achieved with a ratio of 3 parts by weight of nickel hydroxide to 2 parts by weight of conductive plastic.

The amount of liquid added to the system depends principally on the method chosen for applying the resulting slurry to the solid support. For dipping, as illustrated in the specific example above, a ratio of 20 parts by weight of solid in 100 parts by weight of slurry has been found suitable. Alternatively, the active constituents may be applied by spraying a similar composition onto the screen, or by painting or by other conventional coating procedures. Furthermore, with methyl ethyl ketone and benzine as the liquids, they may be used in varying relative proportions, relative proportions from 3:1 to 1:2 have yielded satisfactory results, with optimum results at about 3:2. It should be noted that the ratio of methyl ethyl ketone to benzine is selected to swell but not to dissolve the resin binder. Other combinations of solvent and diluent may be substituted according to the specific polymer employed.

In the process described, the conductive plastic may be prepared with any one or more of the presently well-known alkali-resistant polymers such as polystyrene, polyacrylonitriles, polymethylmethacrylates, or other polyvinyls in place of the copolymer described in the specific example above, provided a suitable mixture of liquids is selected from those known to swell the polymer employed.

Similarly, other liquids than the combination of benzine and methyl ethyl ketone disclosed in the specific example may be used to slurry the mixture of conductive plastic and nickel hydroxide, provided the liquids used swell the plastic, at least to a limited extent and disperse the ingredients sufficiently to permit the deposition of a uniform composition on the nickel screen or other electron source means.

In the composition the filter paper preferably constitutes about 1.4% of the slurry, by weight. Other fibrous cellulosics swellable by the electrolyte may be substituted, in comparable amounts, e.g. from about 0.5% to 3% by weight. While we do not wish to be bound by any specific theory, we believe that the fibrous material imparts a desirable porosity to the composition and thereby improves the operation of the electrode. Whatever the reason, it has been found that the incorporation of the filter paper noticeably improved the durability and the practical current density on discharge.

The preparation of the active material involves two drying stages after various ingredients have been formed into desired mixtures. The first drying stage, in which the conductive plastic itself is dried, is preferably carried out at about 60° C. but satisfactory results may be obtained at temperatures of from 25° C. to 180° C. In the second drying stage of the process, in which a conductive plastic-nickel hydroxide composition is being dried, an upper temperature limit is imposed by deterioration of the nickel hydroxide. Consequently, while 60° C. is again the preferred drying temperature, the range for satisfactory results extends from 25° C. to only 100° C., and 100° C. should not be exceeded for any great length of time.

The susceptibility of nickel hydroxide to deterioration also limits the range of rolling temperatures, a range of 25° C. to 120° C. having been found to yield suitable results, 100° C. being preferred. The rolling schedule may also be varied both as to the number of passes and the extent of the draft taken with each pass which in turn depends to some extent on the rolling facilities employed. One rolling schedule practiced entailed 15 passes with drafts sufficient to reduce the plate thickness about 60%. In other instances, the number of passes has been decreased to as few as 5 or increased to as many as 30 without unfavorably affecting the properties of the resulting plates, to any noticeable extent, corresponding changes having been made in the drafts to achieve the same overall reduction in thickness. The amount of reduction may range between 25% and 75% but in any event the final plate thickness should yield a ratio of material weight (exclusive of the screen) to plate volume of about 18–19 g./cu. in.

We claim:

1. A process for producing positive electrodes for secondary batteries which comprises: preparing an electrically conductive powdered material by dispersing solid particles of a very finely divided electrically conductive material in a solution of an alkali-resistant synthetic polymer, the relative proportions of electrically conductive material and synthetic polymer being between 80 to 20 and 35 to 65, by weight; casting the dispersion into a thin film; drying the film at a temperature between 25° C. and 180° C.; crushing the dried film to yield particles of electrically conductive powder; mixing the resulting particles of electrically conductive powder with a solution of a dissolved metallic salt in sufficient amount to coat the surface of said particles; adding a solution of an alkali to said mixture to effect precipitation of a hydroxide of the metal of the dissolved metallic salt on the surfaces of said powder particles, the ratio of hydroxide to particles being between 1:4 and 4:1, by weight; rinsing the resulting solid products; drying the rinsed product at a temperature between 25° C. and 100° C.; forming a non-aqueous slurry by crushing the rinsed product and dispersing the same as finely divided solids in an inert volatile organic liquid medium, in which the dispersed particles are not soluble; applying a layer of the slurry to a metallic support by dipping the support into a body of slurry and withdrawing the support and adhering layer of slurry therefrom; evaporating the liquid present in said layer, thereby leaving behind a porous deposit comprising an intimate mixture of precipitated hydroxide and polymer particles bearing a coating of electrically conductive material; compacting the resulting porous plate product to diminish the porosity and thickness thereof and to produce a flexible positive electrode, the total amount of compacting corresponding to a reduction in thickness of between 25% and 75%, and the compacting being performed with the plate at a temperature between about 25° and 120° C.

2. The process of claim 1 wherein the thickness of the porous layer is increased by repeating the sequence of applying the slurry and evaporating the liquid until a desired weight of coating has been deposited on the metallic support.

3. The process of claim 1 wherein the metallic screen is a nickel screen.

4. The process of claim 1 wherein the chemically precipitated material is nickel hydroxide, deposited on the plastic particles.

5. The process of claim 1 wherein a fibrous cellulosic material is added to the slurry in an amount of between 0.5 and 3% by weight of the slurry.

6. The process of claim 1 wherein the electrically conductive plastic powder is formed by intimately mixing acetylene black with a polymer and with a solvent for said polymer, and thereafter evaporating the solvent from said mixture.

7. The process of claim 6 wherein the relative proportion of polymer to acetylene black is between 1:4 and 2:1 parts by weight.

8. The positive electrode produced by the process of claim 3.

References Cited in the file of this patent

UNITED STATES PATENTS

| | | |
|---|---|---|
| 684,205 | Edison | Oct. 8, 1901 |
| 801,929 | Fennell et al. | Jan. 30, 1906 |
| 2,708,683 | Eisen | May 17, 1955 |
| 2,737,541 | Coolidge | Mar. 6, 1956 |
| 2,811,572 | Fischbach et al. | Oct. 29, 1957 |
| 2,820,078 | Salauze | Jan. 14, 1958 |
| 2,902,530 | Eisen | Sept. 1, 1959 |

FOREIGN PATENTS

| | | |
|---|---|---|
| 792,464 | Great Britain | Mar. 26, 1958 |